US009854246B2

(12) United States Patent
Tourapis et al.

(10) Patent No.: US 9,854,246 B2
(45) Date of Patent: Dec. 26, 2017

(54) VIDEO ENCODING OPTIMIZATION WITH EXTENDED SPACES

(71) Applicant: Apple Inc., Cupertino, CA (US)

(72) Inventors: Alexandros Tourapis, Milpitas, CA (US); David Singer, San Francisco, CA (US); Guy Cote, San Jose, CA (US); Timothy J. Millet, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 409 days.

(21) Appl. No.: 14/503,200

(22) Filed: Sep. 30, 2014

(65) Prior Publication Data

US 2015/0249833 A1  Sep. 3, 2015

Related U.S. Application Data

(60) Provisional application No. 61/946,649, filed on Feb. 28, 2014.

(51) Int. Cl.
| | |
|---|---|
| *H04N 19/154* | (2014.01) |
| *H04N 19/103* | (2014.01) |
| *H04N 19/124* | (2014.01) |
| *H04N 19/176* | (2014.01) |
| *H04N 19/196* | (2014.01) |
| *H04N 19/40* | (2014.01) |

(52) U.S. Cl.
CPC ......... *H04N 19/154* (2014.11); *H04N 19/103* (2014.11); *H04N 19/124* (2014.11); *H04N 19/176* (2014.11); *H04N 19/196* (2014.11); *H04N 19/40* (2014.11)

(58) Field of Classification Search
CPC .. H04N 19/154; H04N 19/103; H04N 19/124; H04N 19/176; H04N 19/196; H04N 19/40
See application file for complete search history.

(56) References Cited

U.S. PATENT DOCUMENTS

| 8,249,145 B2 | 8/2012 | Chang et al. |
|---|---|---|
| 8,503,536 B2 | 8/2013 | Zuo et al. |
| 2011/0194618 A1 | 8/2011 | Gish et al. |
| 2013/0235938 A1* | 9/2013 | Huang ................. H04N 19/176 375/240.18 |
| 2014/0112394 A1 | 4/2014 | Sullivan et al. |
| 2014/0307785 A1* | 10/2014 | Topiwala ............. H04N 19/164 375/240.07 |

* cited by examiner

*Primary Examiner* — Thai Tran
*Assistant Examiner* — Christopher T Braniff
(74) *Attorney, Agent, or Firm* — Robert L. Hails; Baker Hostetler LLP

(57) ABSTRACT

Embodiments of the present invention may provide a video coder. The video coder may include an encoder to perform coding operations on a video signal in a first format to generate coded video data, and a decoder to decode the coded video data. The video coder may also include an inverse format converter to convert the decoded video data to second format that is different than the first format and an estimator to generate a distortion metric using the decoded video data in the second format and the video signal in the second format. The encoder may adjust the coding operations based on the distortion metric.

23 Claims, 8 Drawing Sheets

100

200

400

500

600

800

VIDEO ENCODING OPTIMIZATION WITH EXTENDED SPACES

CROSS-REFERENCE TO RELATED APPLICATIONS

The present application claims priority to U.S. Provisional Application No. 61/946,649 filed Feb. 28, 2014, the entirety of which is incorporated by reference herein.

BACKGROUND

The present invention relates to video coding techniques.

Video distribution systems include a video source and at least one receiving device. The video content may be distributed over a network, such as broadcast television, Over The Top (OTT) delivery, Internet Protocol Television (IPTV), etc., or over fixed media, such as Blu-ray, DVDs, etc. To keep complexity and cost low, video content is typically limited in dynamic range, e.g., 8-10 bit signal representations and 4:2:0 color format.

Recent advances in display technology, however, have opened the door for the use of more sophisticated content, including content characterized as High Dynamic Range (HDR) and/or wide color gamut (WCG), as well as content with increased spatial and/or temporal resolution. High Dynamic Range content are essentially characterized by an increased dynamic range, which is described as the ratio between the largest and smallest possible values that are represented in the signal. For video content, in particular, there is an interest in supporting content that can have values as small as 0.005 nits ($cd/m^2$), where the nit unit is a metric used to measure/specify luminance, up to 10000 nits in the entertainment space, whereas in other academic and scientific spaces lower and higher values are also of interest. Wide color gamut content, on the other hand, is content that is characterized by a larger representation of color information than is currently common in the industry, which is rather limited. In some applications it is even desirable to be able to represent the color gamut space that humans can perceive. These features can help in providing a more "lifelike" experience to the viewer.

Also, content providers are given more "artistic" flexibility because of the increased choices. This higher quality content is typically converted to a lower range using a Transfer Function (TF) and color conversion before encoding for distribution using a video codec system. These steps can introduce banding and other artifacts that may impact and substantially degrade the quality of the video content when decoded and displayed. In particular, the conversion (initial quantization) stemming from the TF and color conversion can introduce a first error, $E_q$, which is carried through the entire process, and the encoding can introduce an additional error, $E_e$. Further, errors (e.g., $E_q$) can be compounded because conventional encoders make similarity/distortion measures that are based on the "in process" video source, i.e., the converted signal.

Therefore, the inventors perceived a need in the art for an improved encoding process capable of handling higher quality content that results in an improved experience at the decoder compared to conventional encoders, and may reduce banding, improve resolution, as well as reduce other artifacts.

DETAILED DESCRIPTION

Embodiments of the present invention may provide a method for coding. The method may include performing coding operations on an in-process formatted input signal to generate coded video data. The method may also including decoding the coded video data and converting the decoded video data to another format than the in-process format. Further, the method may include estimating coding factors using the another formatted decoded video data and the input signal in the another format. Based on the estimated factors, the method may include adjusting the coding operations and outputting the coded video data.

Embodiments of the present invention may provide a non-transitory computer readable medium storing program instructions that, when executed by a processing device, causes the device to perform a method. The method may include coding an input signal, in a first format, to generate an output signal; decoding the output signal; converting the decoded output signal to a second format; estimating coding factors using the decoded output signal in the second format; and based on the estimated factors, adjusting the coding of the input signal in the first format.

Embodiments of the present invention may provide a video coder. The video coder may include an encoder to perform coding operations on a video signal in a first format to generate coded video data, and a decoder to decode the coded video data. The video coder may also include an inverse format converter to convert the decoded video data to second format that is different than the first format and an estimator to generate a distortion metric using the decoded video data in the second format and the video signal in the second format. The encoder may adjust the coding operations based on the distortion metric.

Figure 1:
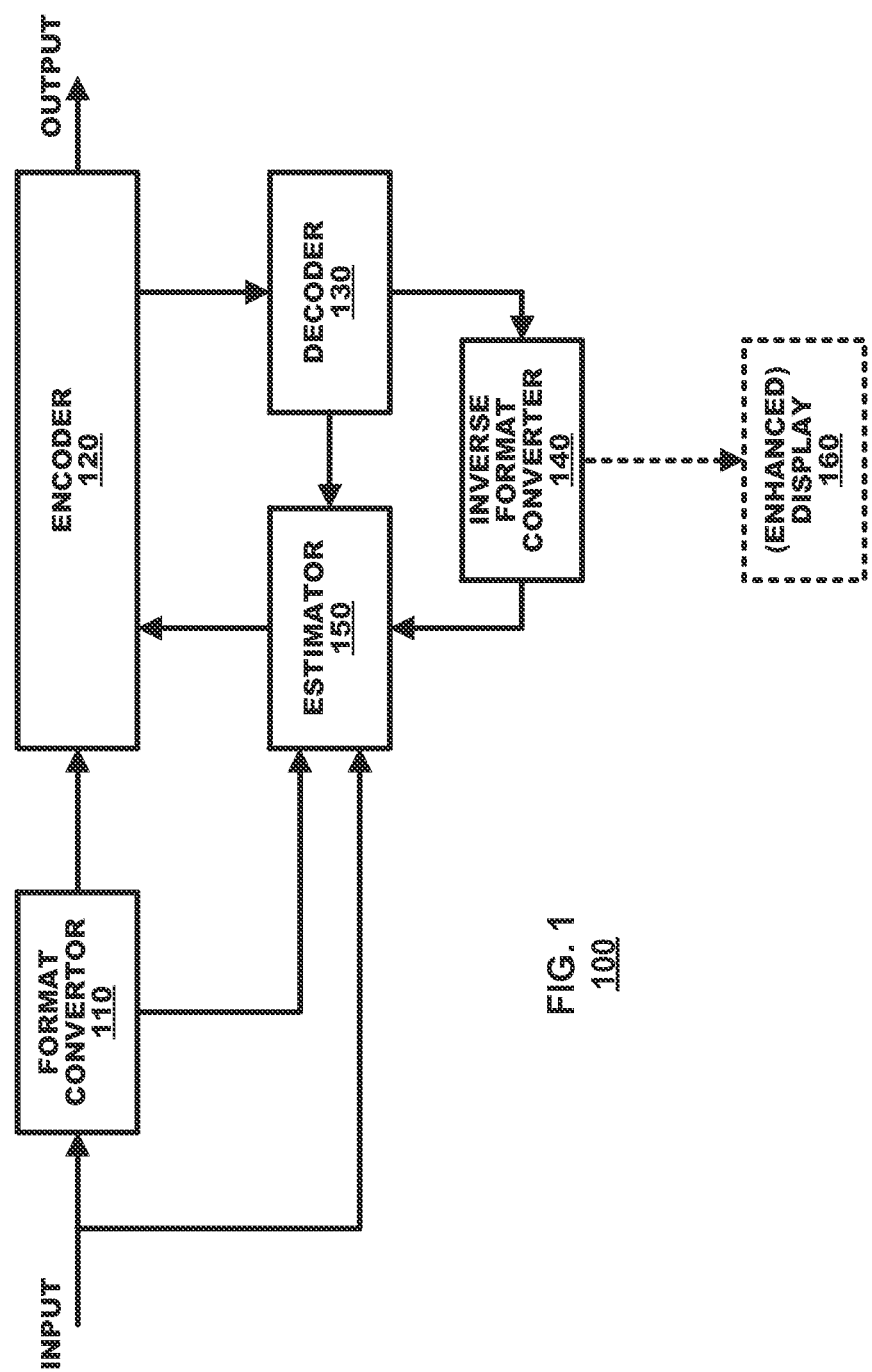
FIG. 1 is a simplified block diagram of an encoder system according to an embodiment of the present invention.

FIG. 1 illustrates an encoder system 100 according to an embodiment of the present invention. The encoder system 100 may include a format converter 110, an encoder 120, a decoder 130, an inverse format converter 140, and an estimator 150. In an embodiment, the encoder system 100 may also include an "enhanced" display 160.

The format converter 110 may include an input for an input signal to be coded. The format converter 110 may convert the format of an input signal to a second format. The format converter 110, for example, may perform down-conversion that converts a higher resolution input signal to a lower resolution. For example, the format converter 110 may convert an input signal that is a 12 bit signal with 4:4:4 color format, in a particular color space, e.g. RGB ITU-R BT.2020, and of a particular TF type to a 10 bit signal with a 4:2:0 color format, in a different color space, and using a different TF. The signals may also be of a different spatial resolution.

The encoder 120 may be coupled to the format converter 110. The encoder 120 may receive the format converted input signal generated by the format converter 110. The encoder 120 may perform coding operations on the converted input signal and generate coded video data, which is outputted from the encoder system 100. The output signal may then undergo further processing for transmission over a network, fixed media, etc.

The encoder 120 may exploit temporal and spatial redundancies in the video data. In an embodiment, the encoder 120 may perform motion compensated predictive coding. Different embodiments of encoder 120 are described below in further detail.

The decoder 130 may be coupled to the encoder 120. The decoder 130 may decode the coded video data from the encoder 120. The decoder 130 may include a decoder picture buffer (DPB) to store previously decoded pictures.

The inverse format converter 140 may be coupled to the decoder 130. The inverse format converter 140 may convert the decoded data back to the format of the original input signal. The inverse format converter 140 may perform an up-conversion that converts lower or different resolution and/or formatting data to a higher or different resolution and/or formatting. For example, the inverse format converter 140 may convert the decoded data that is a 10 bit signal with the 4:2:0 color format and of a particular TF, to a 12 bit signal in a 4:4:4 color format, and with a different TF.

In an embodiment, bit-depth up-conversion may be performed by a right shift operation, a multiplication operation by a value, bilateral filtering, or other suitable operations. In an embodiment, chroma upsampling (e.g., 4:2:0 to 4:4:4) may be performed by an FIR interpolation filter or other suitable operations. Color space conversion may include a matrix multiplication. Moreover, other traits may be converted (and inverse converted) such as resolution, TF, linear data (e.g., floating point) to a fixed point representation using a particular, potentially perceptually optimized, TF, etc. For example, the input signal may be converted (and inverse converted) from one TF to another TF using suitable techniques.

The estimator 150 may estimate errors and/or other factors in the coding operation. In an embodiment, the estimator 150 may calculate a distortion metric and search the decoded picture data for image data to serve as a prediction reference for new frames to be coded by the encoder 120. In an embodiment, the estimator 150 may receive the original and format converted input signals as well as the decoded data before and after inverse format conversion as inputs, and may make its decisions accordingly. In an embodiment, the estimator 150 may select coding parameters such as slice type (e.g., I, P, or B slices), intra or inter (single or multi-hypothesis/bi-pred) prediction, the prediction partition size, the references to be used for prediction, the intra direction or block type, and motion vectors among others.

The distortion metric used in the encoding decision process may be, for example, the mean or sum of absolute differences (MAD or SAD), the sum of absolute transformed differences (SATD), the mean or sum of square differences/errors (MSE or SSE), the peak signal to noise ratio (PSNR), the structural similarity index (SSIM), and other suitable operations that may also involve other signal characteristics such as brightness, texture (e.g., variance), edges or other information. In an embodiment, the distortion computations may be performed at a variety of stages, e.g., at the intra prediction and full-pixel or half-pixel motion estimation stages, during quantization such as trellis based quantization decision process, during the coding unit/macroblock/block mode decision, picture or sequence level. The computation may involve predicted samples and/or fully reconstructed (prediction+inverse quantized/transformed residuals). In an embodiment, the distortion computations may also include an estimate or an exact computation of the bits involved for coding any associated information to the encoding, e.g. mode information, motion vectors or intra prediction modes, quantized transform coefficients etc. Distortion and bitrate may be combined into a rate-distortion criterion, e.g. using the Lagrangian optimization formulation of $J=D+\lambda*R$, where D is the distortion, R is the rate, and $\lambda$ is the lagrangian multiplier.

In an embodiment, an "enhanced" display 160 may be coupled to the inverse format converter 140 to display the decoded video data. The enhanced display 160 may be configured to display the expanded characteristics provided in the original input signal.

The encoding system 100 of FIG. 1 provides improved performance over conventional systems that base their encoding on the "in process" signal (lower quality/resolution/bit-depth/chroma sampling formatted signal). The encoding system 100, on the other hand, optimizes encoding operations by minimizing distortion versus the original (higher quality/resolution) input signal. Therefore, the visual experience of the viewer is improved without adding complexity to the target decoder.

In an embodiment, besides bit-depth and chroma format differences, the original input signal and the "in process signal" (i.e., format converted signal) may also differ with respect to other aspects such as resolution, frame-rate, color space, TF, etc. For example, the original input signal may be represented as a floating-point representation (e.g., images provided using OpenEXR format) but may have to be coded using a power-law gamma or logarithmic TF, among others. These other aspects may be considered by the encoder system to provide appropriate inverse format conversion.

Figure 2:
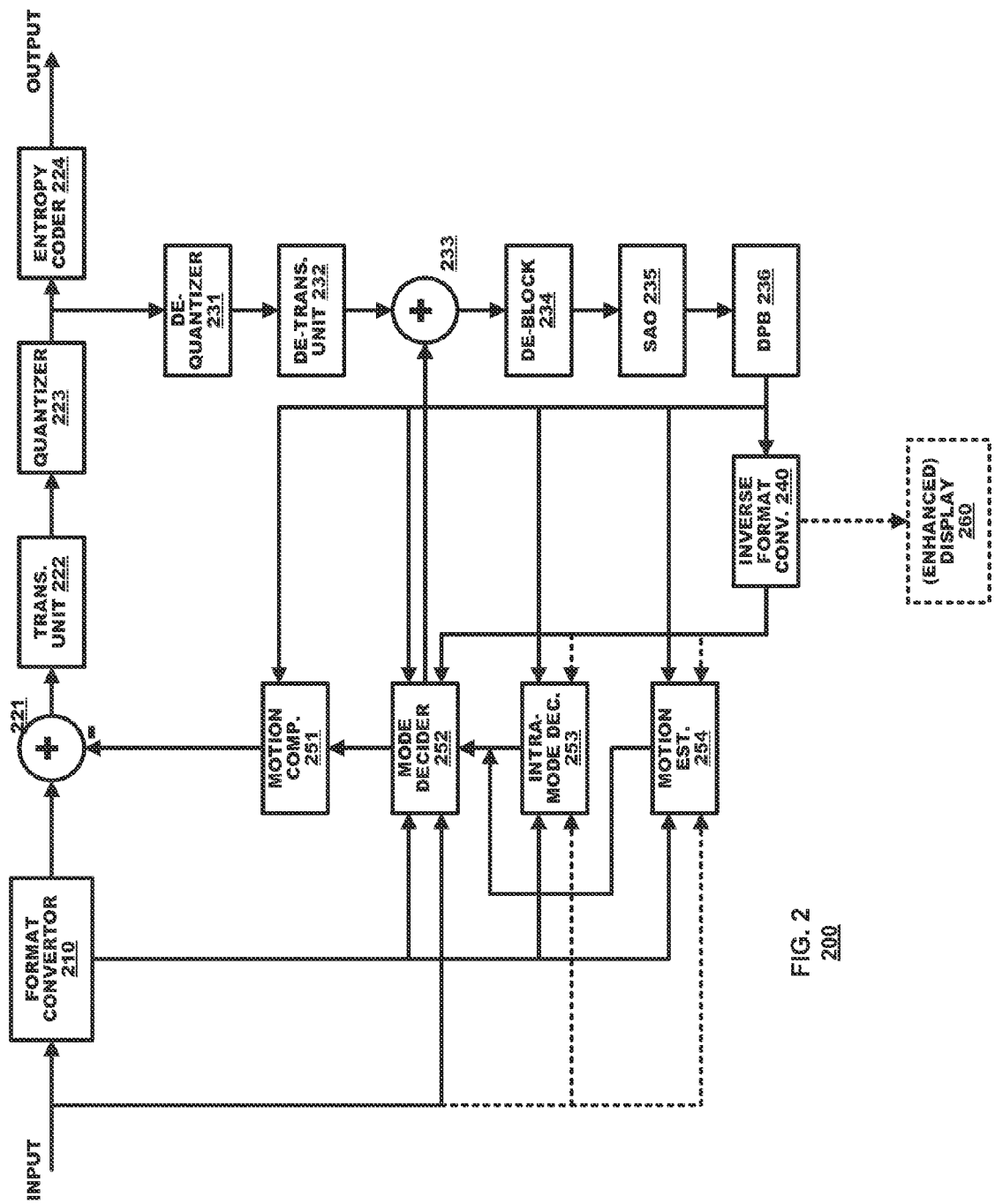
FIG. 2 is a simplified block diagram of an encoder system according to an embodiment of the present invention.

FIG. 2 illustrates an encoder system 200 according to an embodiment of the present invention. The encoder system 200 may include a format converter 210, a subtractor 221, a transform unit 222, a quantizer unit 223, an entropy coder 224, a de-quantizer unit 23, a de-transform unit 232, an adder 233, a de-blocking unit 234, a sample adaptive offset (SAO) filter 235, a decoder picture buffer (DPB) 236, an inverse format converter 240, a motion compensation/intra prediction unit 251, a mode decider unit 252, an intra-mode decider unit 253, and a motion estimator unit 254. In an embodiment, the encoder system 200 may also include an "enhanced" display 260.

The format converter 210 may include an input for an input signal to be coded. The format converter 210 may convert the format of an input signal to a second format. The format converter 210, for example, may perform down-conversion that converts a higher resolution input signal to a lower resolution. For example, the format converter 210 may convert an input signal that is a 12 bit signal with 4:4:4 color format, in a particular color space, and of a particular TF type to a 10 bit signal with a 4:2:0 color format in a different color space and using a different TF. The signals may also be of a different spatial resolution.

The subtractor 221 may be coupled to the format converter 210 and may receive the format converted signal generated by the format converter 210. The subtractor 221 may generate data representing a difference between a source pixel block and a reference block developed for prediction. The transform unit 222 may convert the difference to an array of transform coefficients, as by a discrete cosine transform (DCT) process or wavelet transform for example. The quantizer unit 223 may quantize the transform coefficients obtained from the transform unit 222 by a quantization parameter QP. The entropy coder 224 may code the quantized coefficient data by run-value coding, run-length coding, arithmetic coding or the like, and may generate coded video data, which is outputted from the encoder system 200. The output signal may then undergo further processing for transmission over a network, fixed media, etc.

Adjustments may also be made in the coding process described above. For example, the encoder system 200 may include a prediction loop. The de-quantizer 231 may be coupled to the quantizer 223. The de-quantizer 231 may reverse the quantization performed by the quantizer 223. The de-transform unit 232 may apply an inverse transform on the de-quantized data. The de-transform unit 232 may be complementary to the transform unit 222 and may reverse its transform operations.

The adder 233 may be coupled to the de-transform unit 232 and may receive, as an input, the inverse transformed data generated by the de-transform unit 232. The adder 233 may also receive an input from the mode decider unit 252, which will be described in further detail below. The adder 233 may combine its inputs and output the result to the de-blocking unit 234. The de-blocking unit 234 may include a de-blocking filter to remove artifacts of block encoding. The SAO filter 235 may be coupled to the de-blocking unit 234 for further filtering. The filtered output may then be stored in the DPB 236, which may store previously decoded data.

The inverse format converter 240 may convert the decoded data back to the format of the original input signal. The inverse format converter 240 may perform an up-conversion that converts lower or different resolution and/or formatting data to a higher or different resolution and/or formatting. For example, the inverse format converter 240 may convert the decoded data that is a 10 bit signal with 4:2:0 color format and of a particular TF, to a 12 bit signal with 4:4:4 color format and of a different TF.

Next, operations of the adjustment units—motion compensation/intra prediction unit 251, mode decider unit 252, intra-mode decider unit 253, and motion estimator unit 254—will be described. The motion estimator unit 254 may receive the formatted input signal from format converter 210 and the decoded data from DPB 236. In an embodiment, the motion estimator unit 254 may also receive the higher quality original input as well as the inverse format converted data from the inverse format converter 240 (illustrated with the dotted lines), and thus the motion estimation may be performed using the higher quality representation signals in this embodiment. Based on received information, the motion estimator unit 254, for each desired reference, may derive motion information that would result in an inter prediction hypothesis for the current block to be coded.

The intra-mode decider unit 253 may receive the formatted input signal from format converter 210 and the decoded data from DPB 236. In an embodiment, the intra-mode decider unit 253 may also receive the higher quality original input as well as the inverse format converted data from the inverse format converter 240 (illustrated with the dotted lines), and thus the intra-mode decision may be performed using the higher quality representation signals in this embodiment. Based on received information, the intra-mode decider unit 253 may estimate the "best" intra coding mode for the current block to be coded.

The mode decider 252 unit may receive the original input signal and the decoded data from the inverse format converter 240. Also, the mode decider unit 252 may receive the formatted input signal from format converter 210 and the decoded data from DPB 236. Further, the mode decider unit 252 may receive information from the intra-mode decider unit 253 and the motion estimator unit 254. Based on received information—in particular the original input signal and the inverse format converted data—the mode decider unit 252 may select a mode of operation for the current block or frame to be coded. For example, the mode decider unit may select from a variety of mode/prediction type, block size, reference modes, or even perform slice/frame level coding decisions including: use of intra, or single or multi-hypothesis (commonly bi-predictive) inter prediction; the size of the prediction blocks; whether a slice/picture shall be coded in intra (I) mode without using any other picture in the sequence as a source of prediction; whether a slice/picture shall be coded in single list predictive (P) mode using only one reference per block when performing inter predictions, in combination with intra prediction; and whether a slice/picture shall be coded in a bi-predictive (B) or multi-hypothesis mode, which allows, apart from single list inter and intra prediction the use of bi-predictive and multi-hypothesis inter prediction.

The motion compensation/intra prediction unit 251 may receive input from the mode decider unit 252 and the decoded data from the DPB 236. Based on received information, the motion compensation/intra prediction unit 251 may generate a reference block for the current input that is to be coded. The reference block may then be subtracted from the format converted signal by the subtractor 221. Therefore, the encoder system 200 may optimize encoding operations based on the original input signal, which may have a higher resolution/quality, rather than the "in process" signal (format converted signal). This improves the quality of the encoding process, which leads to a better visual experience for the viewer at the target location.

In an embodiment, an "enhanced" display 260 may be coupled to the inverse format converter 240 to display the decoded video data. The enhanced display 260 may be configured to display the expanded characteristics provided in the original input signal.

In another embodiment, estimation may use hierarchical schemes (e.g., pyramid based motion estimation approach, multi-stage intra-mode decision approach). Here, the lower stages of the scheme may use the "in process" video data as it is less costly and these lower stages typically operate on a "coarse" representation of the signal making the use of higher quality signals (e.g., the input signal and inverse format converted signal) less beneficial. The higher stages (e.g., final stages), however, may user the higher quality signals (e.g., the input signal and inverse format converted signal); therefore, system performance would still be improved.

Figure 3:
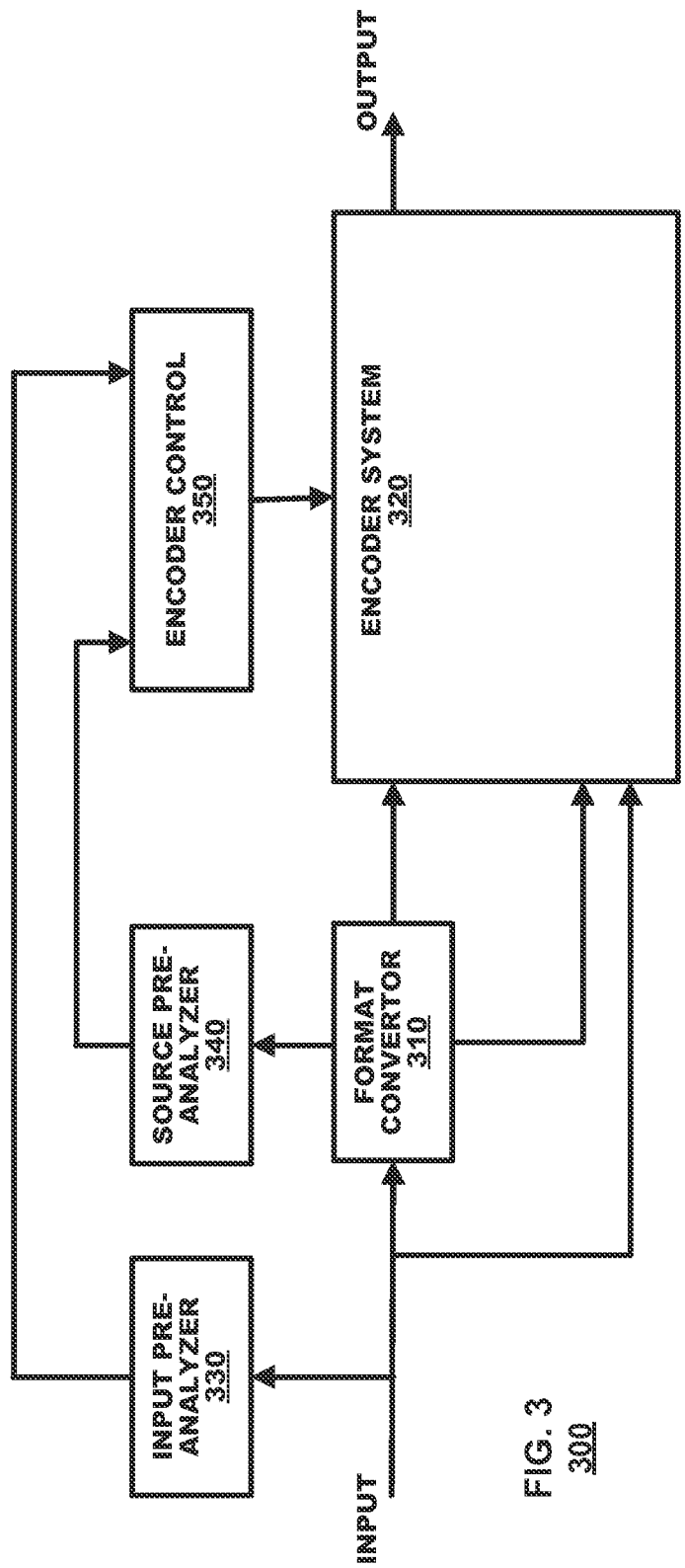
FIG. 3 is a simplified block diagram of a coding system with adaptive coding according to an embodiment of the present invention.

Techniques for optimizing video encoding described herein may also be used in conjunction with adaptive coding. FIG. 3 illustrates a coding system 300 with adaptive coding according to an embodiment of the present invention. The coding system 300 may include a format converter 310, an encoder system 320, an input pre-analyzer 330, a source pre-analyzer 340, and an encoder control 350. The format converter 310 may operate similarly as the previously described format converter 110, 210 of FIGS. 1-2. The encoder system 320 also may operate similar to the previously described elements of FIG. 1 (elements 120-160) and FIG. 2 (elements 221-260). Therefore, their description will not be repeated here.

The input pre-analyzer 330 may derive information regarding the input signal. For example, information regarding areas that may be considered more important than other areas may be derived. The source pre-analyzer 340 may derive information regarding the format converted signal, i.e., the "in process" signal.

The encoder control unit 350 may receive information from the input pre-analyzer 330 and source pre-analyzer 350, and may adjust coding decisions accordingly. For example, the coding decisions may include rate control quantization parameter decisions, mode decisions (or other decisions impacting mode decisions), motion estimation, SAO control, de-blocking control etc. In an embodiment, quantization parameters may be allocated to areas based on the original input signal. This may improve quality because the quantization parameters are based on the original target space rather than only the "in process" space.

Figure 4:
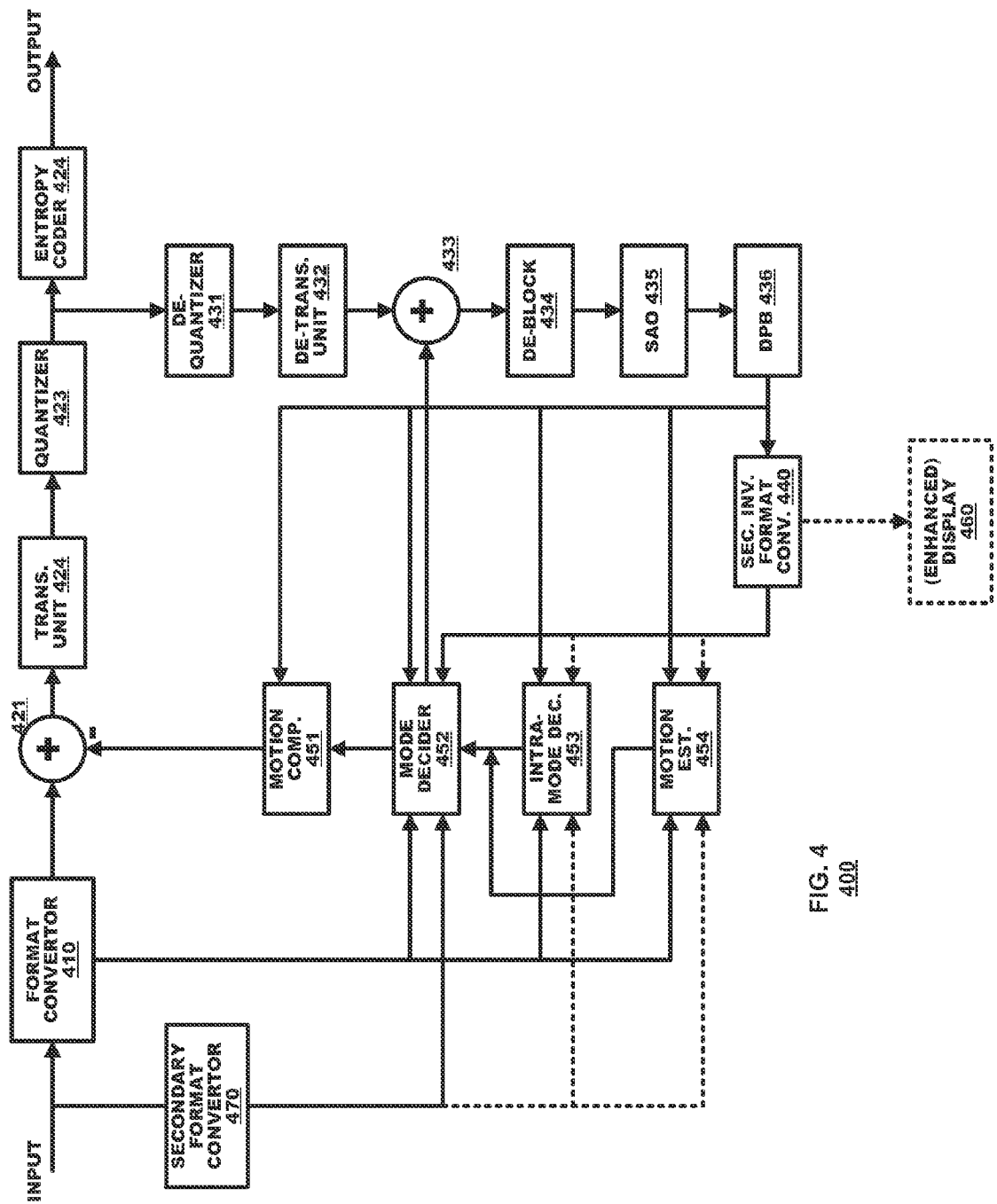
FIG. 4 is a simplified block diagram of an encoder system with a secondary format according to an embodiment of the present invention.

Sometimes, the specifications of a target display may be known by the encoder. In these instances, it may be beneficial to optimize encoding operations based on the target display specifications to improve the viewer experience. FIG. 4 illustrates an encoder system 400 with a secondary format according to an embodiment of the present invention. The encoder system 400 may include a format converter 410, a subtractor 421, a transform unit 422, a quantizer unit 423, an entropy coder 424, a de-quantizer unit 431, a de-transform unit 432, an adder 433, a de-blocking unit 434, a sample adaptive offset (SAO) filter 235, a decoder picture buffer (DPB) 436, an inverse format converter 470, a motion compensation/intra prediction unit 452, a mode decider unit 452, an intra-mode decider unit 253, a motion estimator unit 454, and a secondary format converter 470. In an embodiment, the encoder system 400 may also include an "enhanced" display 460. All components except the secondary format converter 470 and secondary inverse format converter 440 are described above in the discussion of FIGS. 1-3, and their description will not be repeated here.

The secondary format converter 470 convert the input signal into a secondary format of a target display device. For example, the target display may be an HDR display whose specifications, such as particular TF, peak brightness, higher resolution, etc., may be different from that of the original input signal and the format converter 410. The secondary format converter 470 may then be configured to the same specifications as the target display, and provide second format converted signal to the adjustment units such as the mode decider unit 452 (and optionally the intra-mode decider unit 253 and motion estimator unit 454) to use instead of the original input signal as described above in the FIGS. 1-3 discussion. The secondary inverse format converter 440 may be complementary to the secondary format converter 470 and may convert the decoded data to the secondary format, and not the format of the original input signal. As a result, the encoding process may be optimized for the target display capabilities.

Figure 5:
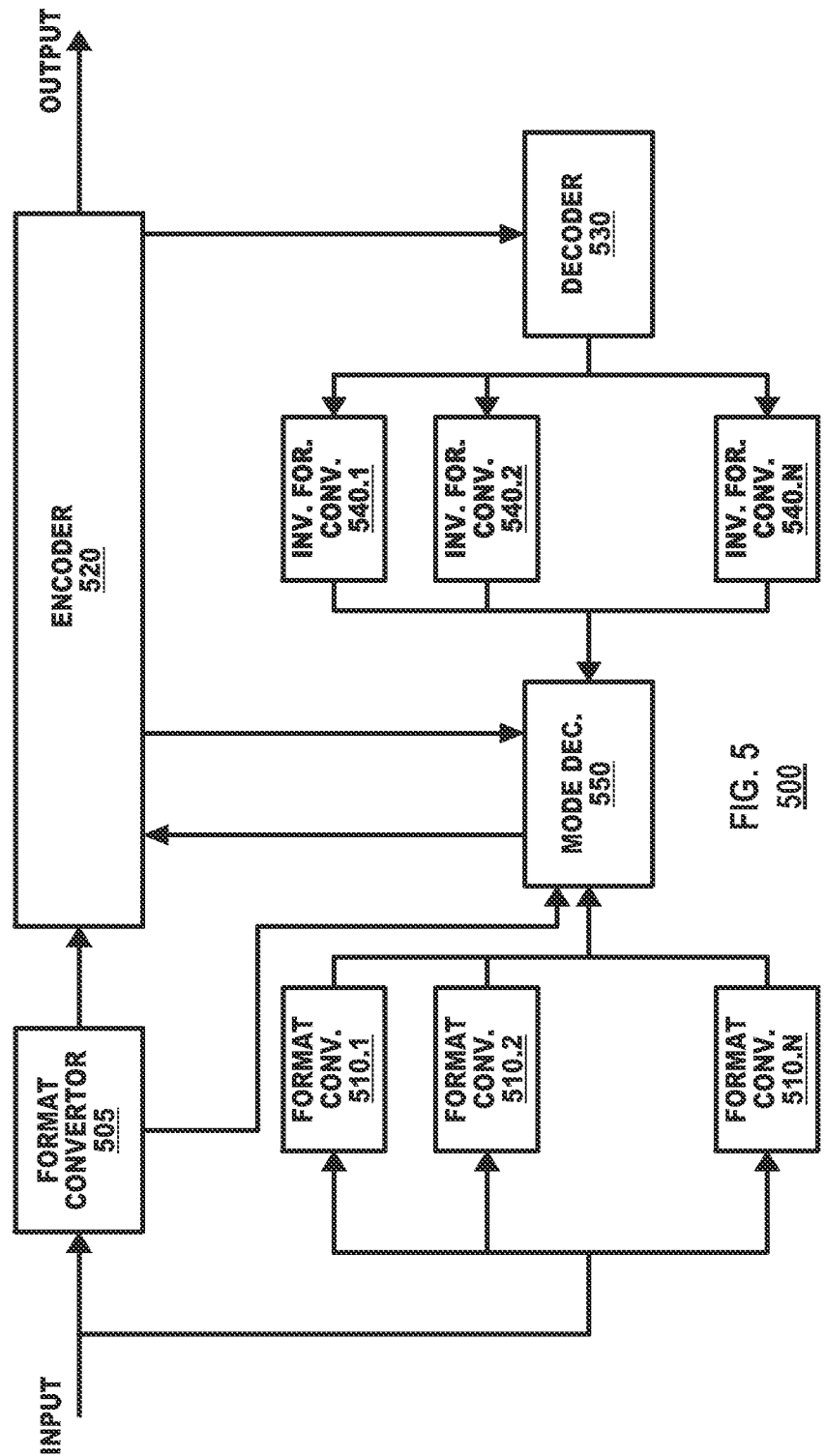
FIG. 5 is a simplified block diagram of an encoder system with multiple format consideration according to an embodiment of the present invention.

In other instances, the output signal may be directed to different target display devices. For example, the same output signal may be transmitted to a TV, a tablet, and a phone. In these instances, it may beneficial to optimize the encoding operations based on the different target display specifications. FIG. 5 illustrates an encoder system 500 with multiple format consideration according to an embodiment of the present invention. As illustrated, the encoder system 500 may include a format converter 505, an encoder 520, a decoder 530, and a mode decider unit 550. In addition to these elements that are described above in the discussion of FIGS. 1-4 and whose description will not be repeated here, the encoder system 550 may also include other components described in the discussion above of FIGS. 1-4, which are not illustrated in FIG. 5 for clarity purposes.

Also, the encoder system 500 may include a plurality of format converters 510.1-510.N and complementary inverse format converters 540.1-540.N. Each converter of the plurality of format converters 510.1-510.N may convert the input signal to a different format (e.g., different bit representation, different chroma format or/and color space, different TF, etc.). In an embodiment, each format may correspond to a different target display device. For example, a first target display device may be a TV, a second target display device may be a tablet, a third target display device may be a phone, etc., where each display device has a different display specification. Each inverse converter of the plurality of inverse format converters 540.1-540.N may complement one of the format converters 510.1-510.N. In addition to the features and operations described above in the discussion of the previous figures, the mode decider unit 550 may be coupled to the plurality of format converters 510.1-510.N and the plurality of complementary inverse format converters 540.1-540.N. The mode decider unit 550 may thus take into account formats of all of the target devices when choosing coding parameters such as mode decisions.

The mode decider unit 550 may employ a weighting function for the different formats. The weighting can correspond to the deployment of each target display, the viewer importance, the type of display, and other like information. For example, a home cinema display may be weighted higher than a smaller display (e.g., phone). Also, the same display may be given a different weight depending on the time. For example, a mobile device display may be weighted lower when the viewer is likely to be on the move as compared to when the viewer is likely to be at home. In an embodiment, mode decisions may be performed using a single step decision where all possible distortions are considered simultaneously.

Figure 6:
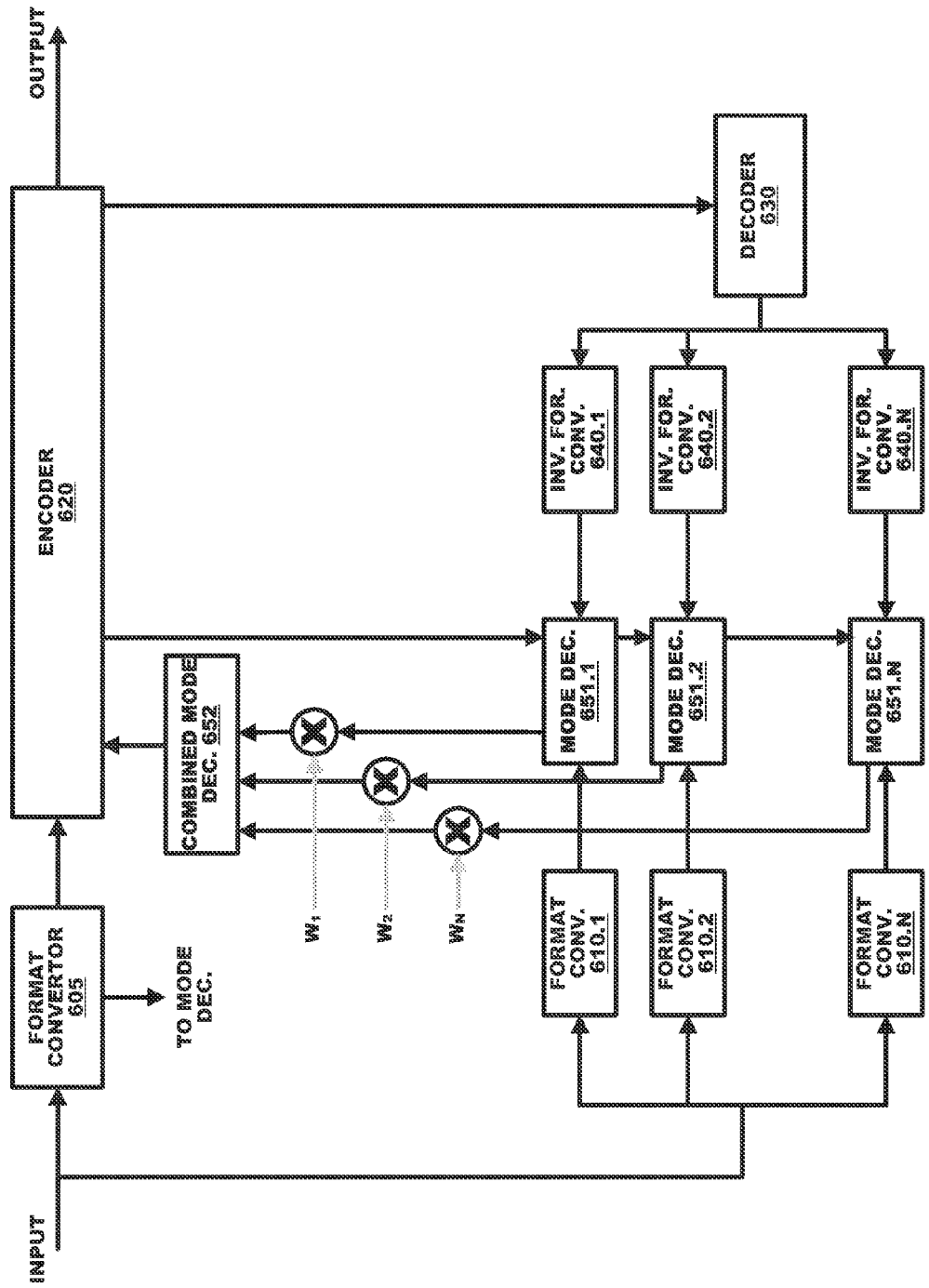
FIG. 6 is a simplified block diagram of an encoder system with multiple format consideration according to an embodiment of the present invention.

FIG. 6 illustrates an encoder system 600 with multiple format consideration according to another embodiment of the present invention. In addition to the features and operations described above in the discussion of FIG. 5, the encoder system 600 may include a multi-stage predictor decision scheme. Here, a plurality of mode decision units 651.1-651.N that correspond to the different formats may be provided. Each mode decision unit may make its decision independently (in isolation). Then each decision may be weighted based on different factors. Based on the weighted decisions, a combined mode decision unit 652 may select the optimal mode and/or other predictor decisions such as intra-mode decision and motion estimation.

In an embodiment, the combined decision may be based on a subset of formats. In another embodiment, similar formats may be grouped together and modeled in a common format (e.g, format converter 610.1 may correspond to models of different displays that share some common characteristics). The common format may be based on a dominant display of the group or, alternatively, may be based on the average of characteristics of the group.

Figure 7:
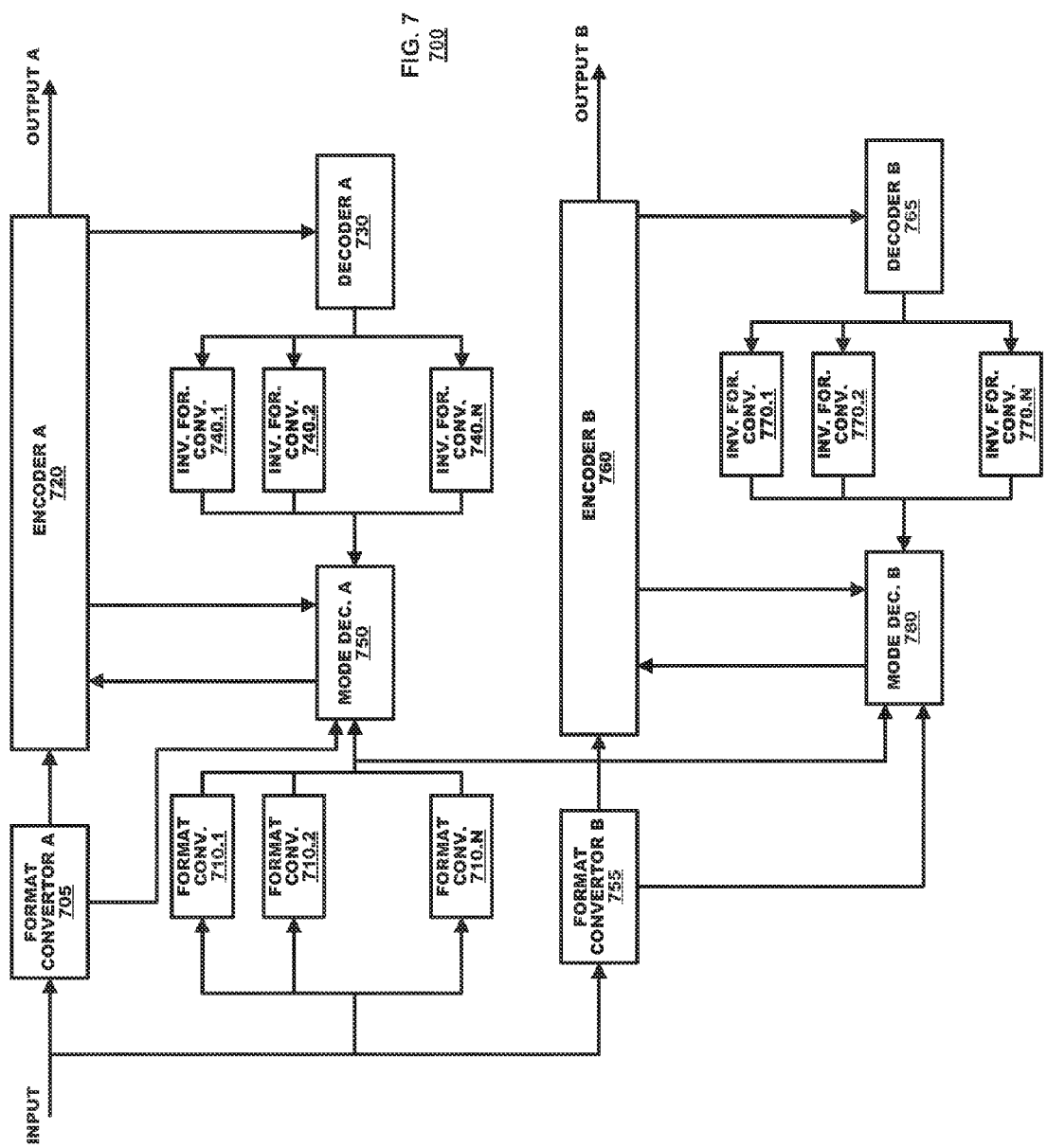
FIG. 7 is a simplified block diagram of an encoder system with for multi-target/multi-screen implementation according to an embodiment of the present invention.

Encoding techniques described herein may also be implemented in multi-target and/or multi-screen environment. FIG. 7 illustrates an encoder system 700 utilized in a multi-target/multi-screen implementation according to an embodiment of the present invention. The encoder system 700 may generate multiple output bitstreams (e.g., OUTPUT A and OUTPUT B) for the same content where each output may be generated using different encoding parameters. As illustrated, the encoder system 700 may include a format converter A 705, an encoder A 720, a decoder A 730, a mode decider unit A 750, a format converter B 755, an encoder B 760, a decoder B 756, a mode decider unit B 780. In addition to these elements that are described above in the discussion of FIGS. 1-6 and whose description will not be repeated here, the encoder system 700 may also include other components described in the discussion above of FIGS. 1-6, which are not illustrated in FIG. 7 for clarity purposes.

The encoder system 700 may include a plurality of format converters 710.1-710.N, which may be shared by multiple encoding processes (e.g., A and B). Each converter of the plurality of format converters 710.1-710.N may convert the input signal to a different format (e.g., different bit representation, different chroma format and/or color space, different TF, etc.). The encoder system 700 may include a plurality of inverse format converters 740.1-740.N for encoding process A and a plurality of inverse format converters 770.1-770.N for encoding process B. In an embodiment, these inverse format converters may be complementary to the format converters 710.1-710.N.

FIG. 7 illustrates two encoding processes (A and B) for illustration purposes only, and the coding system may be implemented with any M number of encoding processes generating M different output streams. Each process may use different encoding parameters. These parameters may, for example, include different bitrates, resolution, bit-depth, the use of different TFs, color space conversion, and chroma subsampling among others, and may be selected to satisfy the needs of different clients with different capabilities. One client may, for example, be a lower resolution client with limited bit-depth capabilities (e.g. a mobile display), while a second client may be capable of higher resolutions and have higher dynamic range capabilities. These bitstreams could be optimized separately or jointly (i.e. by reusing information such as motion, mode, or pre-analysis statistics), using the techniques described herein for coding optimization.

Moreover, these techniques may also be applied to adaptive streaming where the different screens may correspond to different alternative stream representations between which a client can switch. For example, if a client is connected on a high bandwidth network and in an appropriately lit environment, it may select to use a signal that has been encoded using a TF that best maximizes the visual experience for that environment, whereas if this client was moved into a different and more constraint environment, the client may switch to a stream that better caters for that environment's characteristics. In an embodiment, the streams may be pre-generated and available for the client for the switching (e.g. using HLS or DASH among others). In another embodiment, say in the real communication case, the encoder may switch its coding characteristics dynamically (e.g., on the fly) to cater for the adaptations and changes that will occur onto the signal. For example, forward and inverse format conversions utilized in the encoding decision may be adjusted accordingly.

Figure 8:
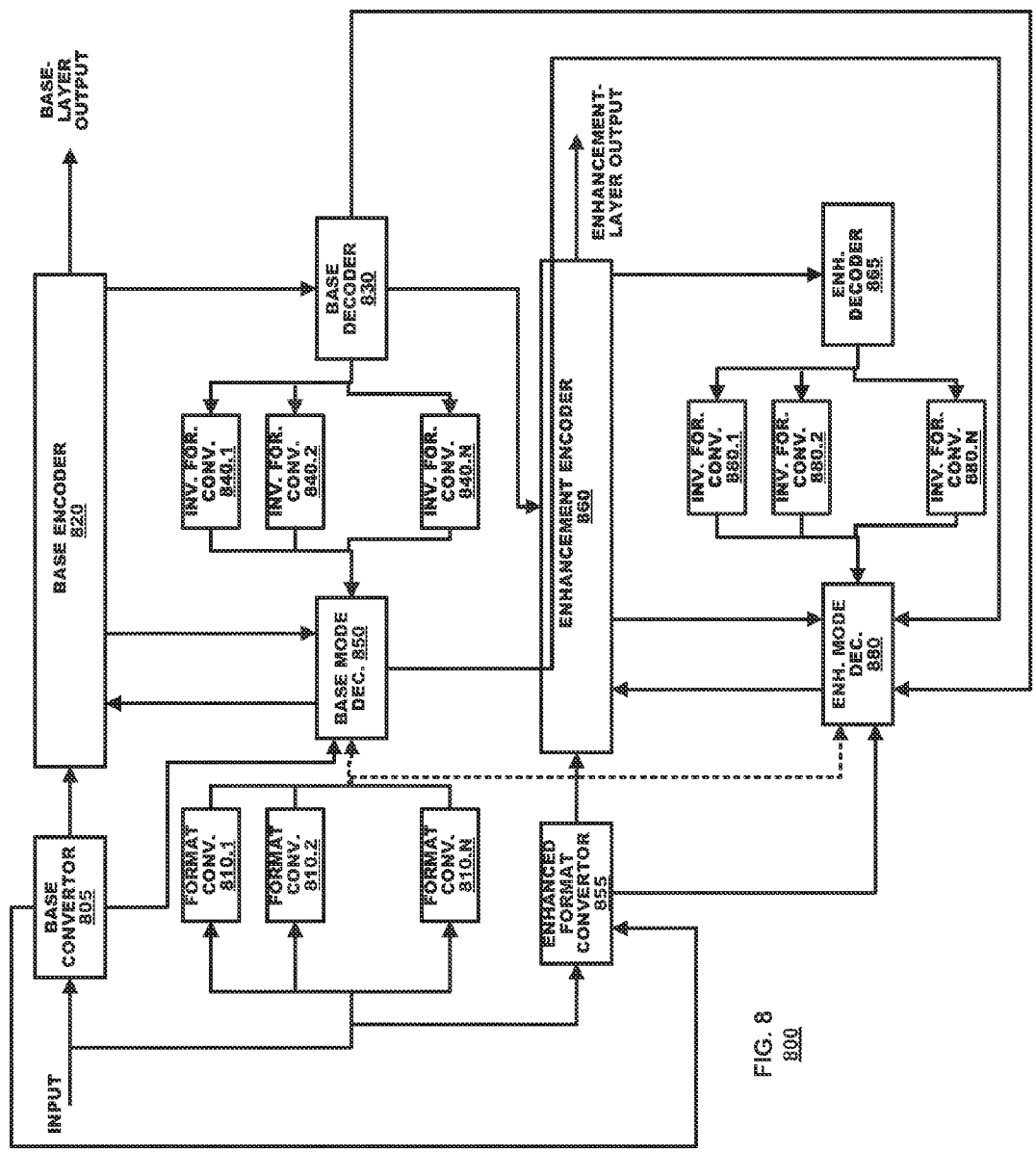
FIG. 8 is a simplified block diagram of a scalable encoder system according to an embodiment of the present invention.

Encoding techniques described herein may also be implemented in scalable encoder environment. FIG. 8 illustrates a scalable encoder system 800 according to an embodiment of the present invention. The scalable encoder system 800 may generate a base-layer output and an enhanced-layer output. Either or both of these outputs may be generated applying the techniques described herein of using the original input signal (or secondary formatted signal(s)) in the respective encoding operation adjustments. As illustrated, the encoder system 800 may include a base format converter A 805, a base encoder 820, a base decoder 830, a base mode decider unit 850, an enhancement format converter 855, an enhancement encoder 860, an enhancement decoder 865, an enhancement mode decider unit 880. In addition to these elements that are described above in the discussion of FIGS. 1-7 and whose description will not be repeated here, the encoder system 800 may also include other components described in the discussion above of FIGS. 1-7, which are not illustrated in FIG. 8 for clarity purposes.

The encoder system 800 may include a plurality of format converters 810.1-810.N, which may be shared by multiple encoding processes. The encoder system 800 may include a plurality of inverse format converters 840.1-840.N for base layer encoding and a plurality of inverse format converters 870.1-870.N for enhancement layer encoding. In an embodiment, these inverse format converters may be complementary to the format converters 810.1-810.N.

As shown, the techniques described herein may be applied to multi-layer, e.g. scalable, video streams and workflows. For example, two (or more) signal representations may be generated: 1) a base layer representation corresponding to a lower representation of the signal, e.g. a lower dynamic range, resolution, frame-rate, bit-depth precision, chroma sampling, bitrate, etc. 2) an enhancement layer representation, which may be added to or considered in conjunction with the first base layer representation to enable a higher quality, resolution, bit-depth, chroma format, or dynamic range experience compared to that of the original. In an embodiment, more than two signal representations may be generated. For example, multiple enhancement layers may be generated using the techniques described herein.

The scalable encoder system may employ a variety of schemes, such as the scalable extension of HEVC, or the SVC extension of AVC, two distinct AVC or HEVC encoders, etc. As described above, the base-layer output or enhancement-layer output, or both layer outputs may be improved using the techniques described herein. Further processing, such as the entire process of how these signals are used and/or combined together to generate the higher representation signal, may be taken into consideration for certain encoding steps, for example mode decision and motion estimation.

The foregoing discussion has described operation of the embodiments of the present invention in the context of terminals that embody encoders and/or decoders. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. Similarly, decoders can be embodied in integrated circuits, such as application specific integrated circuits, field programmable gate arrays and/or digital signal processors, or they can be embodied in computer programs that are stored by and executed on personal computers, notebook computers, tablet computers, smartphones or computer servers. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A method, comprising:
    performing coding operations on an in-process formatted first video data of an input signal to generate coded first video data;
    decoding the coded first video data to produce reference video data in the in-process format;
    converting the decoded reference video data to an other format different from the in-process format;
    estimating coding factors for prediction based on the reference video data in the other format and a second video data of the input signal in the other format;
    performing coding operations on the second video data in the in-process format based on the estimated coding factors for prediction and the reference video data in the in-process format; and
    outputting the coded second video data.

2. The method of claim 1, wherein the other format is an original format of the input signal, and the original format is a higher resolution than the in-process format.

3. The method of claim 1, wherein the coding operations include calculating a distortion metric.

4. The method of claim 1, wherein the coding operations include mode decisions for the current block to be encoded.

5. The method of claim 1, further comprising:
    pre-analyzing the input signal in the other format to derive target space information, and
    controlling quantization parameters during the coding operations of the in-process formatted input signal based on the derived information.

6. The method of claim 1, wherein the other format is based on a target display.

7. The method of claim 1, further comprising:
    converting the input signal into a plurality of formats including the other format;
    converting the decoded video data into the plurality of formats;
    estimating the coding factors using the decoded video data and the input signal, both in the plurality of formats.

8. The method of claim 7, wherein the plurality of formats correspond to different target displays.

9. The method of claim 1, further comprising:
    converting the input signal to a second in-process format;
    performing coding operations on the second in-process formatted input signal to generate second coded video data;
    outputting the first and second coded video data in parallel.

10. The method of claim 9, further comprising:
    decoding the second coded video data;
    converting the second decoded video data to the other format, which is different than the second in-process format;
    estimating coding factors of the second in-process formatted input signal using the on the second decoded data in the other format and the input signal in the other format;
    based on the estimated factors of the second in-process formatted input signal, adjusting the coding operations therein.

11. The method of claim 1, wherein the estimating coding parameters for prediction comprises:
    estimating coding parameters for prediction based on the first video data in the in-process format and a second video data in the in-process format; and
    adjusting the coding parameters for prediction based on the first video data in the other format and a second video data in the other format.

12. A non-transitory computer readable medium storing program instructions that, when executed by a processing device, causes the device to perform a method comprising:
    coding first data of an input signal, in a first format, to generate a first output signal;
    decoding the first output signal;
    converting the decoded first output signal to a second format;
    estimating coding factors for prediction of second data of the input signal based on the decoded output signal in the second format; and
    coding the second data of the input signal in the first format based on the estimated factors.

13. The non-transitory computer readable medium of claim 12, wherein the second format is an original format of the input signal, and the original format is a higher resolution than the first format.

14. The non-transitory computer readable medium of claim 12, further comprising:
    pre-analyzing the input signal in the second format to derive target space information, and
    controlling quantization parameters during coding of the first formatted input signal based on the derived information.

15. The non-transitory computer readable medium of claim 12, wherein the second format is based on a target display.

16. The non-transitory computer readable medium of claim 12,
    converting the input signal into a plurality of formats including the second format;
    converting the decoded output signal into the plurality of formats;
    estimating the coding factors using the decoded output signal and the input signal, both in the plurality of formats.

17. The non-transitory computer readable medium of claim 12, wherein the estimating coding parameters for prediction comprises:
    estimating coding parameters for prediction based on the first video data in the first format and a second video data in the first format; and
    adjusting the coding parameters for prediction based on the first video data in the second format and a second video data in the second format.

18. A video coder, comprising:
an encoder to perform coding operations on first data and second data of a video signal in a first format to generate first coded video data and second coded video data;
a decoder to decode the first coded video data;
an inverse format converter to convert the decoded first video data to second format that is different than the first format;
an estimator to estimate prediction parameters for predicting the second video data in first format from decoded first video data in the first format based on the decoded first video data in the second format and the second video data in the second format; and
wherein the encoder encodes the second video data using the estimated prediction parameters.

19. The video coder of claim 18, wherein the second format is an original format of the video signal, and the original format is a higher resolution than the first format.

20. The video coder of claim 18, further comprising:
a pre-analyzer to pre-analyze the video signal in the second format to derive target space information, and to control quantization parameters during coding operations of the first formatted video signal based on the derived information.

21. The video coder of claim 18, wherein the second format is based on a target display.

22. The video coder of claim 18,
a plurality of format converters to convert the video signal into a plurality of formats including the second format;
a plurality of inverse format converter to convert the decoded video data into the plurality of formats;
wherein the estimator generates the distortion metric using the decoded video data and the video signal, both in the plurality of formats.

23. The video coder of claim 18, wherein the estimating parameters comprises:
estimating prediction parameters based on the first video data in the first format and a second video data in the first format; and
adjusting the prediction parameters for prediction based on the first video data in second format and a second video data in the second format.

* * * * *